(12) United States Patent
Pieruschka et al.

(10) Patent No.: US 8,589,453 B2
(45) Date of Patent: Nov. 19, 2013

(54) MASS MODIFICATION OF ATTRIBUTE VALUES OF OBJECTS

(75) Inventors: Peter Pieruschka, Auckland (NZ); Nikhil Chandran, Forest Hill (AU)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/977,103

(22) Filed: Dec. 23, 2010

(65) Prior Publication Data

US 2012/0166495 A1 Jun. 28, 2012

(51) Int. Cl.
*G06F 7/00* (2006.01)
*G06F 17/30* (2006.01)

(52) U.S. Cl.
USPC ........... 707/805; 715/744; 715/752; 715/762; 715/763; 715/764

(58) Field of Classification Search
None
See application file for complete search history.

(56) References Cited

U.S. PATENT DOCUMENTS

| | | | | | |
|---|---|---|---|---|---|
| 7,130,885 | B2 * | 10/2006 | Chandra et al. | ............... | 709/206 |
| 7,895,243 | B1 * | 2/2011 | Baer et al. | ..................... | 707/805 |
| 7,953,722 | B2 * | 5/2011 | Tatzel et al. | .................. | 707/706 |
| 8,019,828 | B2 * | 9/2011 | Cash et al. | ..................... | 709/217 |
| 8,060,466 | B1 * | 11/2011 | Round et al. | ................. | 707/609 |
| 8,065,202 | B1 * | 11/2011 | Ballaro et al. | ............... | 705/27.2 |
| 2002/0082892 | A1 * | 6/2002 | Raffel et al. | ...................... | 705/8 |
| 2003/0018643 | A1 * | 1/2003 | Mi et al. | .......................... | 707/10 |
| 2003/0069782 | A1 * | 4/2003 | Chrisman et al. | ............... | 705/10 |
| 2004/0117392 | A1 * | 6/2004 | Burgmeier | .................... | 707/100 |
| 2004/0139444 | A1 * | 7/2004 | Hope et al. | ..................... | 719/318 |
| 2005/0234803 | A1 * | 10/2005 | Zhang et al. | .................. | 705/37 |
| 2006/0095276 | A1 * | 5/2006 | Axelrod et al. | .................... | 705/1 |
| 2007/0006149 | A1 * | 1/2007 | Resnick et al. | ............... | 717/116 |
| 2007/0112835 | A1 * | 5/2007 | McMullen et al. | .......... | 707/102 |
| 2007/0192715 | A1 * | 8/2007 | Kataria et al. | ................ | 715/764 |
| 2007/0198325 | A1 * | 8/2007 | Lyerly et al. | .................... | 705/10 |
| 2007/0198600 | A1 * | 8/2007 | Betz | ............................. | 707/201 |
| 2007/0226679 | A1 * | 9/2007 | Jayamohan et al. | .......... | 717/101 |
| 2007/0266331 | A1 * | 11/2007 | Bicker et al. | ................... | 715/764 |
| 2008/0162458 | A1 * | 7/2008 | Walter et al. | ..................... | 707/5 |
| 2008/0163253 | A1 * | 7/2008 | Massmann et al. | .......... | 719/316 |
| 2008/0216072 | A1 * | 9/2008 | Schneider et al. | ............ | 718/100 |
| 2008/0250318 | A1 * | 10/2008 | Walter | .......................... | 715/713 |
| 2009/0077045 | A1 * | 3/2009 | Kirchmeier et al. | .............. | 707/3 |
| 2009/0125482 | A1 * | 5/2009 | Peregrine et al. | .................. | 707/3 |
| 2009/0132533 | A1 * | 5/2009 | Vignet | ............... | 707/7 |
| 2009/0210399 | A1 * | 8/2009 | Simpson et al. | .................. | 707/3 |
| 2009/0327049 | A1 * | 12/2009 | Kisin et al. | ....................... | 705/10 |
| 2010/0057769 | A1 * | 3/2010 | Lippert et al. | ................ | 707/102 |
| 2010/0063959 | A1 * | 3/2010 | Doshi et al. | ................... | 707/618 |
| 2010/0088618 | A1 * | 4/2010 | Mayer-Ullmann | ........... | 715/763 |
| 2010/0299376 | A1 * | 11/2010 | Batchu et al. | .................. | 707/955 |
| 2010/0312605 | A1 * | 12/2010 | Mitchell et al. | .................... | 705/9 |
| 2011/0022642 | A1 * | 1/2011 | deMilo et al. | ................. | 707/805 |
| 2012/0054241 | A1 * | 3/2012 | Brooks et al. | ................. | 707/781 |

* cited by examiner

*Primary Examiner* — Wilson Lee
*Assistant Examiner* — Jessica N Le

(57) ABSTRACT

Various embodiments of systems and methods for mass modification of attribute values of objects are described. The methods include systematically analyzing attributes assigned to multiple objects, displaying the results to the user, enabling mass modification functionality in the user interface, and providing the user a comprehensive variety of options on how to proceed with mass editing.

17 Claims, 8 Drawing Sheets

NOTIFICATION ADMINISTRATION 205

[Save] [Cancel]

/ Recipients / Recipient List /

| [Add System Users] [Add Business Partners] | [Add External Recipient] | [Delete] | [Activate] | [Deactivate] | [Edit Settings] |
|---|---|---|---|---|---|
| Recipient Name 210 | Recipient ID 215 | Source Type 220 | Source Context 225 | Notifications Active 230 | E-mail contact 235 | SMS Contact 240 |
| Guy Lopez | LOPEZ | System User | SMD | ☑ | guy.lopez@fide.com | 5345435346 |
| Britoly Karpov | 143 | BP | SMF | ☐ | britoly.karpov@fide.com | 5635443265 |
| Vishwas Anand | | Free | | ☑ | vishwas.anand@gmail.com | 9675873587 |
| ... | | | | | | |

Notification Settings for Selected Recipients

Notification Settings for Selected Recipients

1 — 2 — 3

Select What to Edit ▾ Select Recipients    Edit Settings

◂ Previous | Next ▸    Cancel    Finish

510 — 520

Notification Modes / During Absences

Notification Modes 530

Time Zone: India ▴

| Communication Mode | Active | Inactive From Date | Inactive from Time | Inactive to Date | Inactive to Time |
|---|---|---|---|---|---|
| Email | ☑ | 18.12.2008 | 00:00 | 15.01.2009 | 23:59 |
| SMS | ☐ | 05.02.2009 | 10:00 | 17.02.2009 | 07:00 |
| ... | | | | | |

545 — 550 — 555 — 560

Notification Schedule for Email 540

Create | Duplicate | Delete

| Day Type | Factory Calendar | Calendar Rule | Holiday Calendar | From | To |
|---|---|---|---|---|---|
| Work day ▸ | India ▸ | OR ▸ | Not selected ▸ | 00:00 | 24:00 |
| Day Off ▸ | India ▸ | AND ▸ | Germany ▸ | 07:00 | 16:00 |
| ... | | | | | |

Notification Settings for Selected Recipients

| 1 | 2 | 3 |
|---|---|---|
| Select What to Edit | Select Recipients | Edit Settings |

[ ▼ Previous ] [ Next ▲ ]  [ Cancel ] [ Finish ]

Notification Modes / During Absences

Planned Absences 610

| [Create] [Delete] | [Modify Substitutes] | [Reset Substitutes] | | |
|---|---|---|---|---|
| Inactive From Date | Inactive From Time | Inactive to Date | Inactive to Time | Time Zone: India ▲ |
| 18.12.2008 | 00:00 | 15.01.2009 | 24:00 | Forward to Substitutes ☑ |
| 05.02.2009 | 10:00 | 17.02.2009 | 07:00 | ☐ |
| ... | | | | |

Substitutes During Absences 620

| [Add Recipients] [Delete] | | | |
|---|---|---|---|
| Substitute Name | ID | Source Type | Source Context |
| | | | |
| | | | |

FIGURE 6

MASS MODIFICATION OF ATTRIBUTE VALUES OF OBJECTS

FIELD

The field generally relates to the software arts, and, more specifically, to methods and systems for mass modification of attribute values of objects.

BACKGROUND

In the computer world, an attribute defines an object, an element, or file. It generally represents a property of a property. Attributes can be considered as metadata. An attribute of an object usually consists of a name and a value; of an element, a type or class name; of a file, a name and extension. Each named attribute may have an associated set of rules called operations. An object definition can be extended by imposing data typing: a representation format, a default value, and legal operations (rules) and restrictions are all potentially involved in defining an attribute. For example, in computer graphics, line objects can have attributes such as: thickness (with real values), color (with descriptive values such as brown or green or values defined in a certain color model, such as RGB), etc. Markup languages, such as Hyper-Text Markup Language (HTML) and eXtensible Markup Language (XML), use attributes to describe data and the formatting of data. In the C# programming language, attributes are metadata attached to a field or a block of code, equivalent to annotations in Java. Attributes are accessible through reflection. In many relational or multi-valued database systems, relative to SQL, tables are files, rows are items, and columns are attributes. In both, the database and code, the attribute is synonymous with a property and variable although attributes can be further defined to contain values and sub-values.

Editing a large number of objects that have a plurality of attributes is a time-consuming task and may lead to decrease in the system's performance and response time. Some groups of these objects may have identical attributes, which one might want to remain identical throughout the given group, even when some changes have to be performed on the these attributes. Without a solution for editing a plurality of attributes at the same time, it can be a very cumbersome task to first identify the members of group of objects with identical attributes and then change them, possibly even one by one.

SUMMARY

Various embodiments of systems and methods for mass modification of attribute values of objects are described herein. In an embodiment, the method includes receiving a selection of a set of objects from a plurality of objects, the plurality of objects displayed in a user interface and receiving a selection of at least one setting to be edited for the set of objects, wherein the setting includes a plurality of attribute values for the set of objects. The method also includes determining statistical distribution on the plurality of attribute values of the set of objects according to the received setting and identifying one or more subsets of objects with equal attribute values from the set of objects in response to the determined statistical distribution. Finally, the method includes enabling a mass modification functionality for the one or more subsets of objects in the user interface upon identifying the one or more subsets of objects.

In an embodiment, the system includes a database storage unit for storing a plurality of objects. The system includes a modification engine including a set of user interfaces to display the plurality of objects for selection of a set of objects from the plurality of objects, the set of objects to be edited based on a selected setting from the set of user interfaces, the setting including a plurality of attribute values. In addition, the system includes an analysis engine to determine statistical distribution on the plurality of attribute values of the set of objects according to the selected setting and to identify one or more subsets of objects with equal attribute values from the set of objects in response to the determined statistical distribution. Finally, the system includes an analysis customizing component to store a threshold based on which a mass modification functionality is enabled for the one or more subsets of objects in the set of user interfaces upon identifying the one or more subsets of objects.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 2 is a block diagram illustrating a screenshot 200 of an exemplary application for mass modification of attributes.

FIG. 5 is a block diagram illustrating a screenshot 500 of an exemplary application for mass modification of attributes.

FIG. 6 is a block diagram illustrating a screenshot 600 of an exemplary application for mass modification of attributes.

DETAILED DESCRIPTION

Embodiments of techniques for mass modification of attribute values of objects are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment.

Furthermore, the particular features, structures, or characteristics may be combined in any suitable manner in one or more embodiment.

A system and a method are proposed by which groups of attributes that have a high probability of having a number of values that is much lower than the number of objects are identified and suitably presented to the user. Then, the user is given a number of options on how to proceed with editing these groups. For example, leaving the groups of attributes intact and just homogeneously modifying a given attribute, creating new groups from the old ones, separating individual members from a group into one or more new groups of attributes, and so on. In various embodiments, the attributes assigned to multiple objects are analyzed, the result is displayed to the user, and the user is given the opportunity of mass editing the attributes of these objects.

Figure 1:
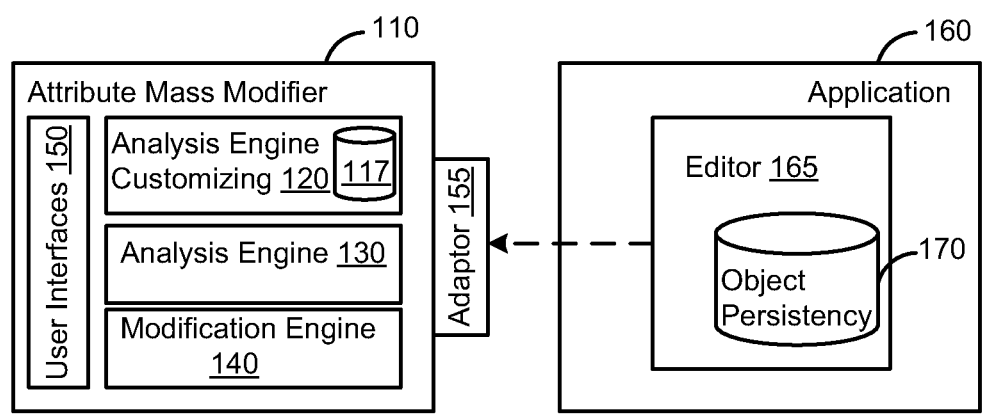
FIG. 1 is a block diagram illustrating the architectural description of the underlying functional components.

FIG. 1 is a block diagram illustrating the architectural description of the underlying functional components. In various embodiments, attribute mass modifier 110 can be implemented as part of a modification tool for administration and configuration inside a system. Attribute mass modifier 110 tool includes analysis engine 130. Analysis engine 130 provides statistical analysis on the attributes of the objects. The statistical analysis includes, but is not limited to, providing information about the number of common attributes for the objects. The result of the statistical analysis includes a number of groups of objects distributed by a common attribute. For example, most of the employees of a company may have a common working time (from 9 a.m. to 6 p.m.) and these employees will be grouped in the same group. Attribute mass modifier 110 tool includes analysis engine customizing 120 component that provides a user (e.g., a system administrator) the possibility to customize some of the settings of the analysis engine 130. For example, the system administrator can customize the number of common attributes above which the attribute mass modifier 110 to be enabled for usage based on the number of groups and the number of objects (e.g., a threshold). The customized settings are stored in database 117. Attribute mass modifier 110 tool also includes modification engine 140. Modification engine 140 represents an application that takes the user step by step through the process of mass modification of attributes. The result is displayed via user interfaces 150.

In various embodiments, the mass modification of attributes feature is enabled when the number of objects is high and the statistical analysis results in distributions that are relatively sharp. For example, if there are 200 objects and all of them are different (i.e., a flat rather than sharp statistical distribution is provided), meaning that they have different attributes, then, the mass modification feature is not enabled as there would be 200 different groups, each group having just one object. In that case no mass modification will be available and the user has to edit each object individually and take 200 decisions. Therefore, the mass modification of attributes is best usable when there are a large number of objects with common attributes. In various embodiments, the initial stage of administration begins with uniform data (e.g., personnel data), where each object has the same data (e.g., attributes) but during the course of administration, some of the attributes get modified. In the end, the number of objects with attributes still similar to the original state is likely to remain very high, thus making the statistical distribution quite sharp.

In various embodiments, the mass modification of attributes may be provided as an abstract implementation of the attribute mass modifier 110. The abstract implementation can be used via adaptor 155 by application 160 only if there is a large number of objects with a small number of attributes with relatively sharp statistical distribution, then the mass modification of attributes will be active (enabled) on the user interface editor 165 for effective and rapid modification of groups of attributes. Object persistency 170 may be a database that stores the plurality of objects used by application 160. Analysis engine 130 performs the statistical analysis based on the objects stored in the object persistency 170 including, but not limited to, how many objects there are, how many different groups with equal attribute values there are, and so on.

FIG. 2 is a block diagram illustrating a screenshot 200 of an exemplary application for mass modification of attributes. Screenshot 200 captures the first step of the methodology for mass modification of attributes of a group of objects. Screenshot 200 shows an exemplary notification administration 205 application for administration of notifications of system users as well as other interested parties (such as a manager who might have business responsibility for a system, but not have a formal user account on that system). The users (recipients) are listed under recipient name 210. Each user is defined with a plurality of settings. The users are stored in the database (e.g., object persistency 170) as objects defined with a plurality of attributes. In the exemplary application, each recipient is defined with the following settings: recipient ID 215, source type 220, source context 225, notifications active 230, email contact 235, SMS contact 240, and so on. The exemplary application also provides a set of functions that give the user (e.g., system administrator) the possibility to add new recipients, delete recipients, edit the settings of each recipient, and so on. In various embodiments, the user can edit the settings of multiple recipients (objects) at the same time. The user selects the desired recipients (e.g., recipient 245 and recipient 250) and then chooses the "Edit Settings" button on the UI.

Figure 3:
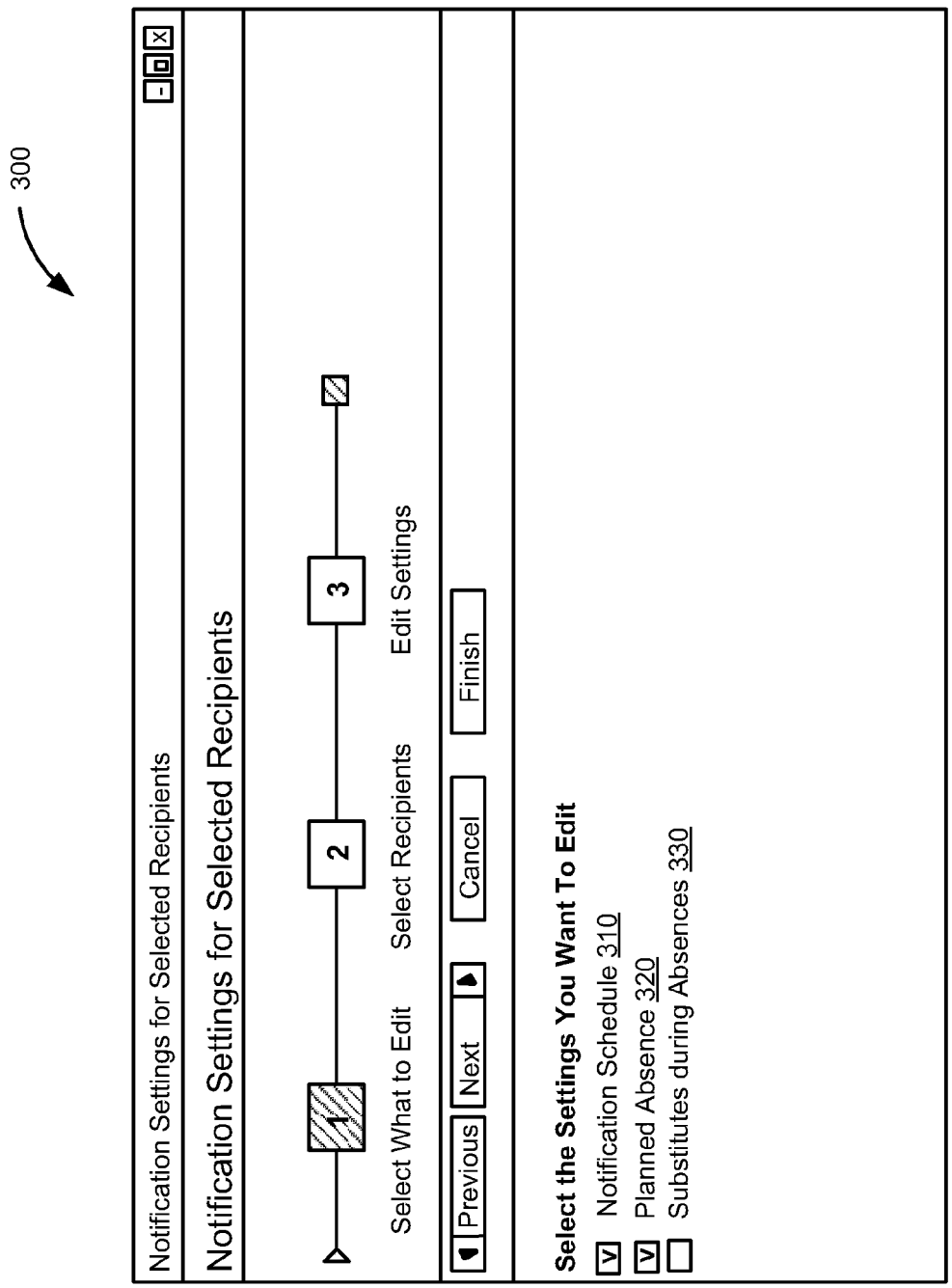
FIG. 3 is a block diagram illustrating a screenshot 300 of an exemplary application for mass modification of attributes.

FIG. 3 is a block diagram illustrating a screenshot 300 of an exemplary application for mass modification of attributes. Screenshot 300 captures the next step of the methodology for mass modification of attributes of a group of objects. After the recipients have been selected, the user is given the possibility to select which settings he or she wants to modify. Screenshot 300 includes the following settings for the selected recipients that can be modified: notification schedule 310, planned absence 320, and substitutes during absences 330. The notification schedule includes a calendar according which a notification is sent to a number of recipients regarding an upcoming event such as a planned downtime of a system. This type of notification is relatively common for most of the users of the system. Generally, it is set up by default to all users and just gets modified for specific users. These settings represent the attributes that are attached to each object, in this case to each recipient. Notification schedule 310 and planned absence 320 are selected for editing, in this example.

Figure 4:
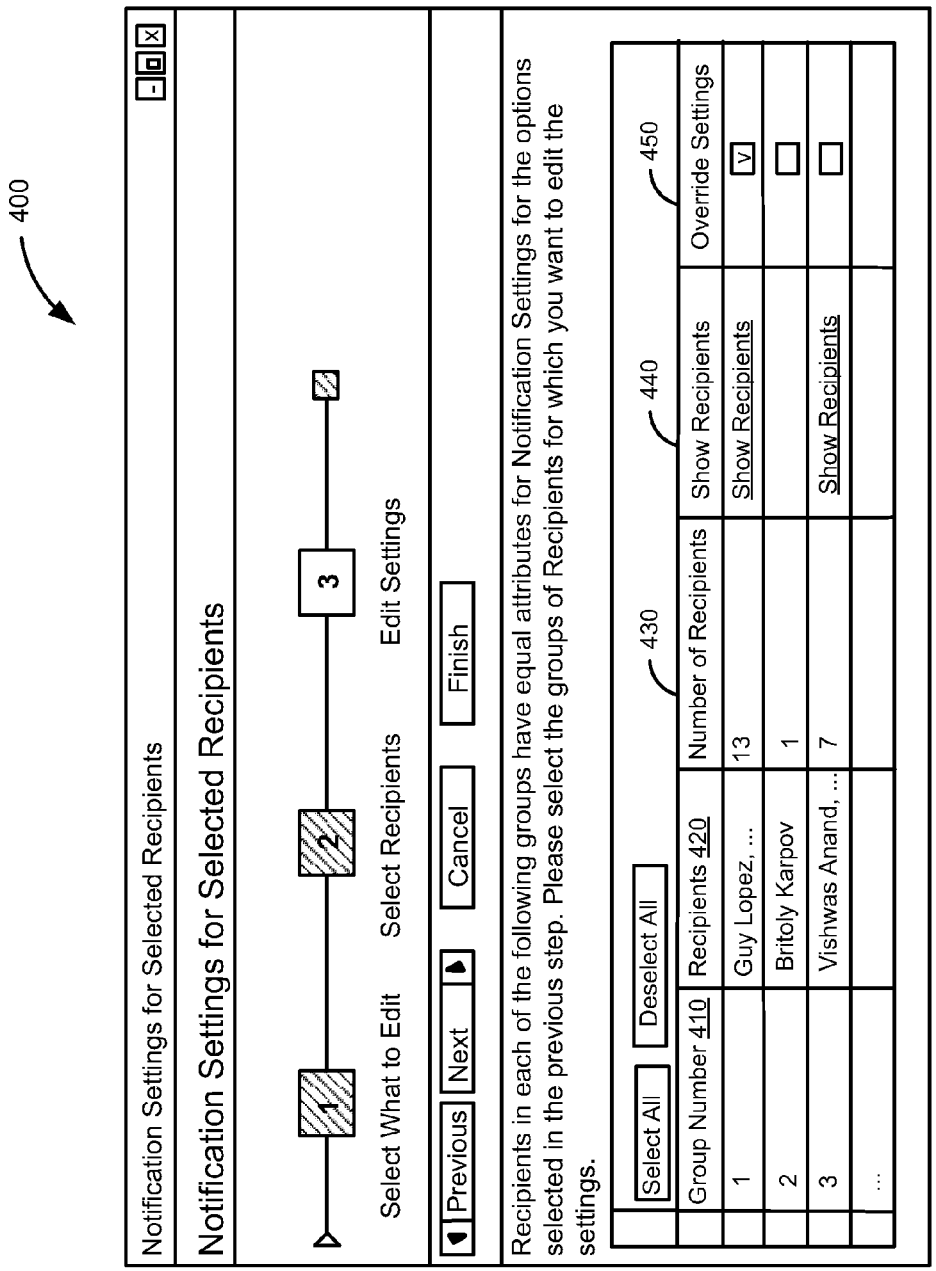
FIG. 4 is a block diagram illustrating a screenshot 400 of an exemplary application for mass modification of attributes.

FIG. 4 is a block diagram illustrating a screenshot 400 of an exemplary application for mass modification of attributes. Screenshot 400 captures the next step of the methodology for mass modification of attributes of a group of objects. According to the selected settings from screenshot 300, the recipients that have equal values of the settings (i.e., the values of the settings are the same) are grouped and thus forming a set of groups of recipients. Each group may be defined with: a group number 410, recipients 420 that are part of the group, a number of recipients 430 in the group, show recipients link 440 to list all recipients, an override settings option 450, and so on. In the exemplary scenario shown on screenshot 400, group 1 has 13 recipients (objects), group 2 has 1 recipient, and group 3 has 7 recipients. As group 2 has only one recipient, there is no direct need for mass modification of the settings for this recipient, unless one wants to, for example, edit that one recipient together with another group (using multiple selection of rows in 400) and thereby merge it into a larger group of recipients. Group 1 and group 3 are, however, suitable targets for mass modification of the chosen settings (e.g., notification schedule 310 and planned absence 320), as they contain multiple members.

FIG. 5 is a block diagram illustrating a screenshot 500 of an exemplary application for mass modification of attributes. Screenshot 500 captures the next step of the methodology for mass modification of attributes of a group of objects. In the exemplary scenario shown on screenshot 400, group 1 is selected for mass modification of the settings of its recipients. Screenshot 500 includes notification modes 510 tab and during absences 520 tab. These tabs correspond to the selected notification schedule 310 and planned absence 320 options of FIG. 3. Each tab provides a set of additional settings that contain the actual data for modification. For example, notification modes 510 tab contains notification modes 530 screen area and notification schedule for email 540 screen area. Notification modes 530 screen area provides the possibility for sending notifications such as email 535 and SMS 537 to the recipients in the group. Different settings can be modified via the displayed tabs 510 and 520. In various embodiments, before editing the attributes (e.g., inactive from date 545, inactive from time 550, inactive to date 555, inactive to time 560, etc.) of the objects in the group, all attributes' values are equal among the objects in the group, after editing some or all of the attributes, the new values of these attributes are applied to all the objects in the group. This means that before editing the objects in the group have one set of equal attributes' values and after editing the objects in the group have a different set of equal attributes' values.

FIG. 6 is a block diagram illustrating a screenshot 600 of an exemplary application for mass modification of attributes. Screenshot 600 captures the details of the during absences 520 tab for mass modification of attributes. Again, visibility of all tabs depends on the options selected in FIG. 3. The during absences 520 tab is visible because it was selected as planned absence 320. During absences 520 contains additional settings such as planned absences 610 and substitutes during absences 620. As substitutes during absences 620 screen area represents the substitutes during absences 330 option in FIG. 3 and it was not selected to be edited, thus substitutes during absences 620 screen area does not contain any data. Similarly to editing the attributes displayed in screenshot 500, after editing some or all of the attributes displayed in screenshot 600, the new values of these attributes are applied to all the objects in the group.

Figure 7:
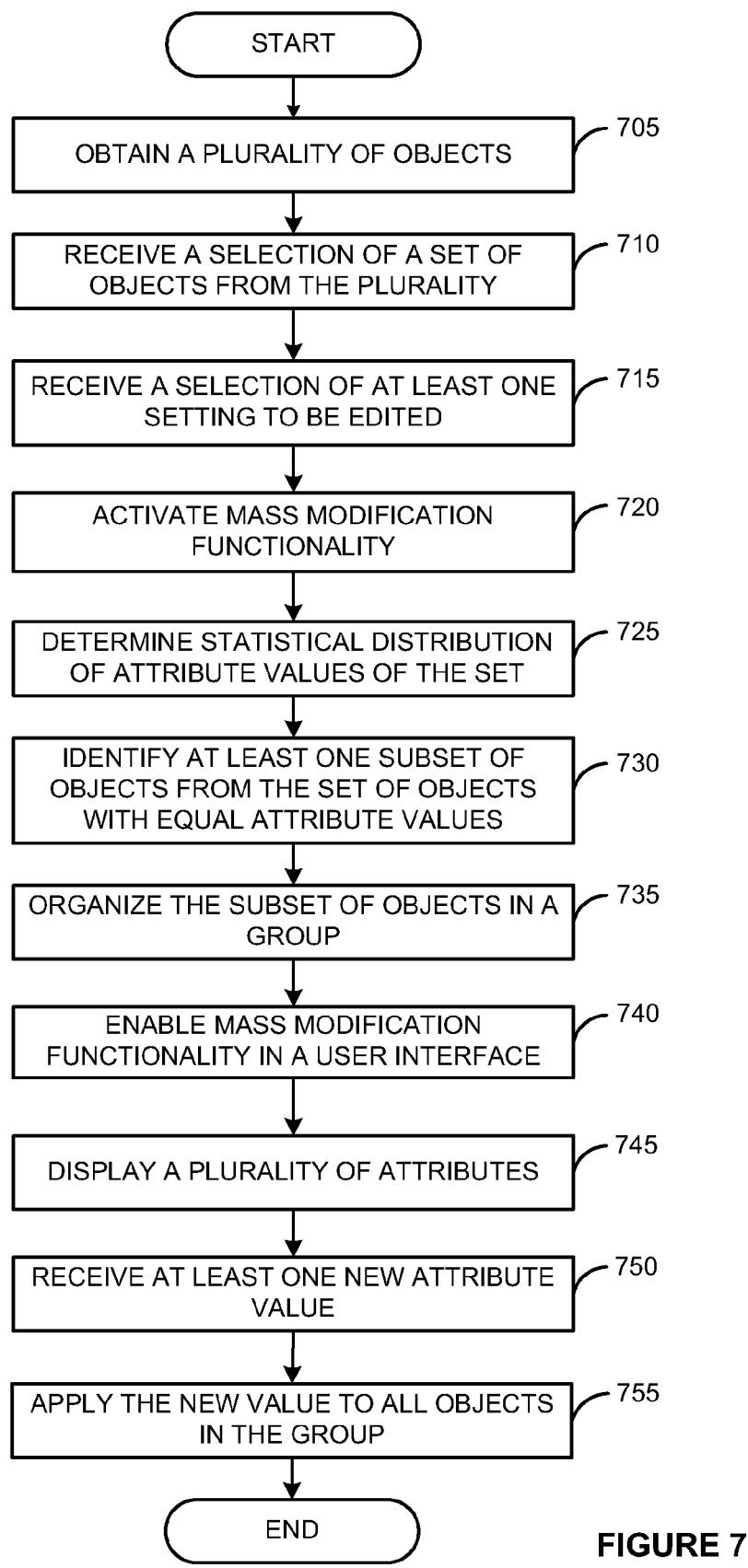
FIG. 7 is a flow diagram illustrating mass modification of attribute values of objects.

FIG. 7 is a flow diagram illustrating mass modification of attribute values of objects. In various embodiments, if the number of object is large (for example, N_Obj>10) and at least some of the attributes of the objects have a small number of possible values, rapid mass editing of these attributes can be achieved. For a big system landscape, the number of recipients (N_Obj) can be very large. At the same time there might be patterns in the attribute structure that are unlikely to vary a lot, for example, the notification schedule 310 of recipients or their patterns of planned absences 320. The notification schedule 310 in the described example of screenshots 200-600 defines when and how recipients will be notified, for example, through emails during regular work hours and through SMS while off work on weekends and after hours. Planned absences 320 would describe when recipients' holidays are and what to do with their notifications during the absence period, e.g., stop them or forward them to a list of substitutes.

At block 705, a plurality of objects needed for performing a task in an application is obtained from object persistency 170. In various embodiments, the task may be in the area including but not limited to administration and configuration. The objects are stored in a database table inside the object persistency 170 with a set of attributes, each attribute having a value. The obtained plurality of objects is displayed in a user interface (UI) of the application, allowing a user (e.g., a system administrator) to administer and configure the plurality of objects. At block 710, a selection of a set of the plurality of objects is received in response to a user interaction with the UI of the application. At block 715, a selection of at least one setting to be edited is received in response to a user interaction with the UI of the application. The settings represent some administrative or configuration settings that the user wants to edit for the set of objects (for example, notification schedule 310 and planned absences 320).

At block 720, mass modification functionality is activated for a certain type of object and at least a subset of its attributes. At block 725, the statistical distribution of attribute values according to the selected settings is determined by the analysis engine 130. This means that the analysis engine determines how many objects of the set of objects have equal attribute values of the selected settings. It may be the case that some objects from the set have equal some attribute values and other objects may have equal other attribute values. At block 730, at least one subset of objects from the set of objects is identified to have equal attribute values. At block 735, the identified subset of objects is organized in a group and displayed to the user. If the number of values of at least one attribute (N_AV) is significantly smaller than the number of objects (N_Obj), i.e., N_AV<<N_Obj, or at least the statistical distribution of N_AV is reasonably sharp, meaning that a few attribute values substantially outweigh other possible values, there will be a small enough number of groups of objects (N_Gr<<N_Obj) with same attribute values that can be identified and displayed to the user for editing.

At block 740, the mass modification functionality becomes enabled for the user in the UI based on a threshold. The threshold represents a proportion of the number of organized groups (N_Gr) to the number of objects in the set of objects according to the selected setting. In various embodiments, if N_Gr<<N_Obj is true, the set of user interfaces of the mass modification functionality becomes available to the user allowing him or her to edit the attribute values. The user may specify the threshold according which the mass modification functionality to become enabled in the UI. The threshold is stored in the analysis engine customizing 120 component. At block 745, a plurality of attributes for the subset of objects in the group is displayed in a set of user interfaces. The set of user interfaces depends on the selected settings. For example, if notification schedule 310 was selected, the set of user interfaces will display attributes relevant to the notification schedule 310 setting such as notification modes 530 and notification schedule for email 540. At block 750, at least one new attribute value is received in response to user interaction (e.g., editing an attribute value) with the set of user interfaces. At block 755, the new attribute value is applied to all objects in the subset of objects in the group or multiple groups being processed. Thus, all objects in the group or groups are updated with the new value and will have equal attribute values after the user interaction.

In various embodiments, the user may modify attribute values of different or same groups multiple times. Each time the mass modification functionality becomes active, the analysis engine will determine which objects have equal attributes and based on that the groups will be formed. There may be the case where the attribute values of the objects are different for all or most of the objects, in that case the mass modification of attributes functionality will not be available to the user as there will be no need for mass modification. The user will still be able to edit a particular attribute value for a given object. The availability of the mass modification functionality depends on the threshold, which the user can configure.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
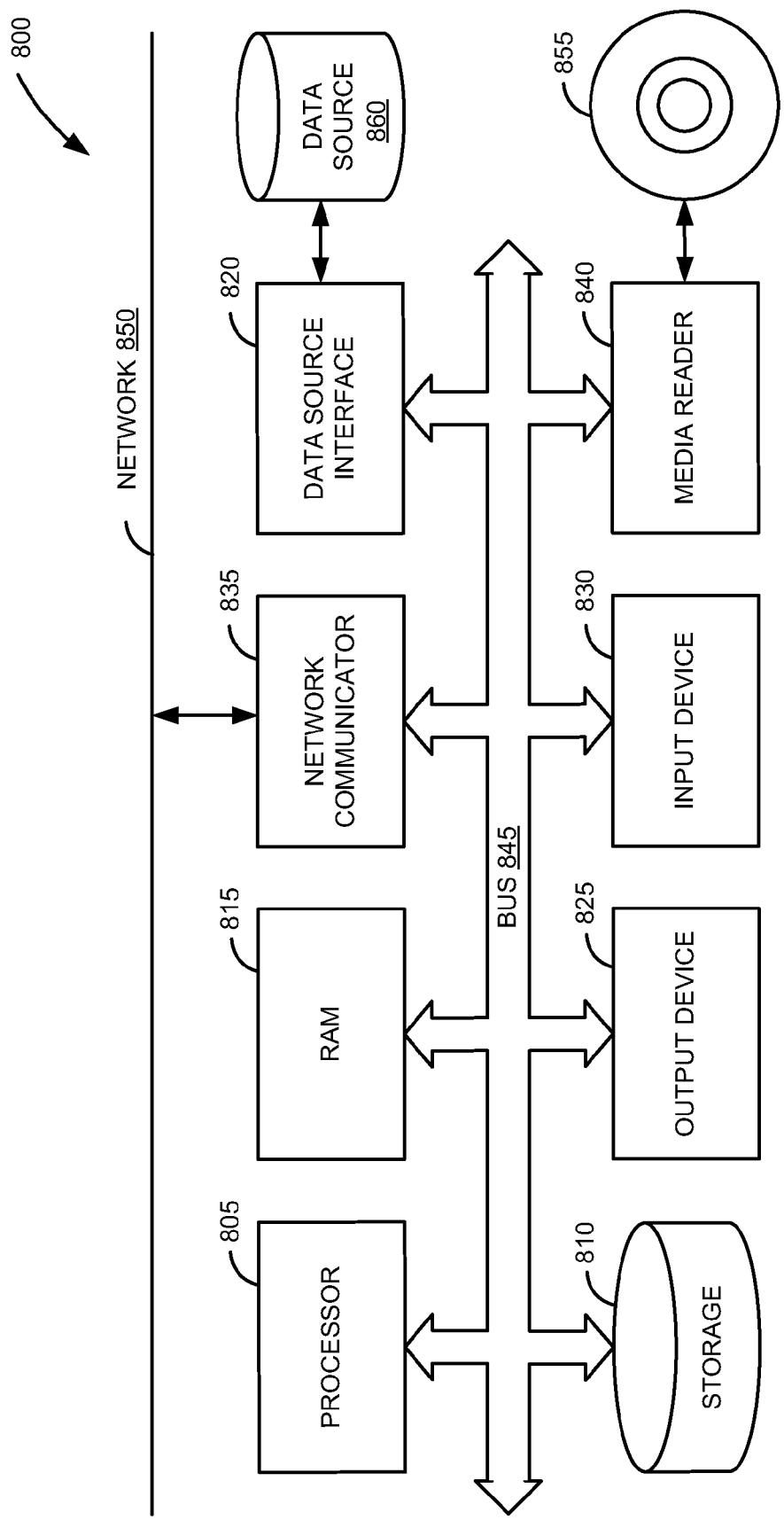
FIG. 8 is a block diagram illustrating an exemplary computer system 800.

FIG. 8 is a block diagram illustrating an exemplary computer system 800. The computer system 800 includes a processor 805 that executes software instructions or code stored on a computer readable storage medium 855 to perform the above-illustrated methods of the invention. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be access via one or more abstraction layers implemented in hardware or software. For example, the data source 860 may be access by network 850. In some embodiments the data source 860 may be accessed via an abstraction layer, such as, a semantic layer.

A data source 860 is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a tangible computer readable storage medium to physically store instructions, which when executed by a computer, cause the computer to:
   receive a selection of a plurality of objects with at least one common attribute, the plurality of objects displayed in a user interface;
   receive a selection of an attribute from the at least one common attribute, wherein for each object of the plurality of objects the attribute has a value of at least one value;
   in response to receiving the selection of the attribute, activate a mass modification functionality;
   in response to activating the mass modification functionality, render the at least one value of the attribute editable at the same time for the plurality of objects;
   determine statistical distribution of the at least one value of the attribute over the plurality of objects;
   based on the determined statistical distribution, identify at least one group of objects from the plurality of objects with equal value of the attribute;
   enable in the user interface a mass modification functionality for the at least one group of objects, wherein the mass modification functionality is enabled based on a threshold that specifies that the objects from the plurality of objects are more in predefined proportion than the number of identified at least one group of objects;
   receive an input value to be applied to the attribute for a group of objects of the at least one group of objects; and
   in response to receiving the input value, mass modify, simultaneously for all objects from the group of objects, the value of the attribute with the input value.

2. The article of manufacture of claim 1, wherein the instructions further cause the computer to:
   upon identifying the at least one group of objects, display the at least one group of objects in the user interface.

3. The article of manufacture of claim 2, wherein the instructions further cause the computer to:
   receive a selection of a first group of objects from the at least one group of objects, and
   merge the selected first group of objects with a second group of objects from the at least one group of objects.

4. The article of manufacture of claim 1, wherein the threshold specifies that the plurality of objects are more in quantity than the identified at least one group.

5. The article of manufacture of claim 1, wherein the threshold is a customizable setting that represents a proportion of the number of the identified at least one group to the number of the plurality of objects.

6. The article of manufacture of claim 1, wherein the identified at least one group is less in quantity than the plurality of objects when the at least one value of the attribute is less in quantity than the plurality of objects.

7. A computer implemented method comprising:
   receiving a selection of a plurality of objects with at least one common attribute, the plurality of objects displayed in a user interface;
   receiving a selection of an attribute from the at least one common attribute, wherein for each object of the plurality of objects the attribute has a value of at least one value;
   in response to receiving the selection of the attribute, activating a mass modification functionality;
   in response to activating the mass modification functionality, rendering the at least one value of the attribute editable at the same time for the plurality of objects;
   a processor of the computer, determining statistical distribution of the at least one value of the attribute over the plurality of objects;
   based on the determined statistical distribution, identifying at least one group of objects from the plurality of objects with equal value of the attribute;
   enabling in the user interface a mass modification functionality for the at least one group of objects, wherein the mass modification functionality is enabled based on a threshold that specifies that objects from the plurality of objects are more in predefined proportion than the number of identified at least one group of objects;
   receiving an input value to be applied to the attribute for a group of objects of the at least one group of objects; and
   in response to receiving the input value, mass modifying, simultaneously for all objects from the group of objects, the value of the attribute with the input value.

8. The method of claim 7, further comprising:
   upon identifying the at least one group of objects, displaying the at least one group of objects in the user interface.

9. The method of claim 8, further comprising:
   receiving a selection of a first group of objects from the at least one group of objects, and
   merging the selected first group of objects with a second group of objects from the at least one group of objects.

10. The method of claim 7, wherein the threshold specifies that the plurality of objects are more in quantity than the identified at least one group of objects.

11. The method of claim 7, wherein the threshold is a customizable setting that represents a proportion of the identified at least one group to the plurality of objects.

12. The method of claim 7, wherein the identified at least one group is less in quantity than the plurality of objects when the at least one value of the attribute is less in quantity than the plurality of objects.

13. A computing system comprising:
   a memory to store executable instructions; and
   a processor coupled to the memory to execute the instructions to:
      receive a selection of a plurality of objects with at least one common attribute, the plurality of objects displayed in a user interface;
      receive a selection of an attribute from the at least one common attribute, wherein for each object of the plurality of objects the attribute has a value of at least one value;
      in response to receiving the selection of the attribute, activate a mass modification functionality;
      in response to activating the mass modification functionality, render the at least one value of the attribute editable at the same time for the plurality of objects;
      determine statistical distribution of the at least one value of the attribute over the plurality of objects;

based on the determined statistical distribution, identify at least one group of objects from the plurality of objects with equal value of the attribute;

enable in the user interface a mass modification functionality for the at least one group of objects, wherein the mass modification functionality is enabled based on a threshold that specifies that the objects from the plurality of objects are more in predefined proportion than the number of identified at least one group of objects;

receive an input value to be applied to the attribute for a group of objects of the at least one group of objects; and in response to receiving the input value, mass modify, simultaneously for all objects from the group of objects, the value of the attribute with the input value.

14. The system of claim 13 further to:

upon identifying the at least one group of objects, display the at least one group of objects in the user interface.

15. The system of claim 14 further to:

receive a selection of a first group of objects from the at least one group of objects, and merge the selected first group of objects with a second group of objects from the at least one group of objects.

16. The system of claim 13, wherein the threshold is a customizable setting that represents a proportion of the number of the identified at least one group to the number of the plurality of objects.

17. The system of claim 13, wherein the identified at least one group is less in quantity than the plurality of objects when the at least one value of the attribute is less in quantity than the plurality of objects.

* * * * *